(12) United States Patent
Nolterieke et al.

(10) Patent No.: US 9,286,173 B2
(45) Date of Patent: Mar. 15, 2016

(54) DYNAMIC USE OF RAID LEVELS RESPONSIVE TO PREDICTED FAILURE OF A DATA STORAGE DEVICE

(71) Applicant: Lenovo Enterprise Solutions (Singapore) Pte. Ltd., Singapore (SG)

(72) Inventors: Michael H. Nolterieke, Raleigh, NC (US); William G. Pagan, Durham, NC (US); Devon D. Snyder, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/680,235

(22) Filed: Apr. 7, 2015

(65) Prior Publication Data
US 2015/0212911 A1 Jul. 30, 2015

Related U.S. Application Data

(60) Division of application No. 13/541,429, filed on Jul. 3, 2012, now Pat. No. 9,037,794, which is a continuation of application No. 12/956,966, filed on Nov. 30, 2010, now Pat. No. 9,032,146.

(51) Int. Cl.
*G06F 12/02* (2006.01)
*G06F 11/20* (2006.01)
(Continued)

(52) U.S. Cl.
CPC ............ *G06F 11/2069* (2013.01); *G06F 3/061* (2013.01); *G06F 3/0614* (2013.01); *G06F 3/0631* (2013.01); *G06F 3/0685* (2013.01); *G06F 3/0689* (2013.01); *G06F 11/1084* (2013.01); *G06F 11/1096* (2013.01); *G06F 11/1451* (2013.01); *G06F 11/1464* (2013.01);
(Continued)

(58) Field of Classification Search
CPC G06F 3/0689; G06F 11/2069; G06F 11/1096
USPC ........................................................ 711/114
See application file for complete search history.

(56) References Cited

U.S. PATENT DOCUMENTS

| | | |
|---|---|---|
| 6,530,004 B1 | 3/2003 | King et al. |
| 7,010,596 B2 | 3/2006 | Bantz et al. |

(Continued)

FOREIGN PATENT DOCUMENTS

| | | |
|---|---|---|
| JP | 3065734 A | 3/1991 |
| JP | 4355836 A | 12/1992 |
| WO | WO2009158220 A2 | 12/2009 |

OTHER PUBLICATIONS

Zhao-et al.; "Experimental Study of Virtual Machine Migration in Support of Reservation of Cluster Resources"; ACM Digital Library; pp. 1-8; 2007.

(Continued)

*Primary Examiner* — Jae Yu
(74) *Attorney, Agent, or Firm* — Katherine S. Brown; Jeffrey L. Streets

(57) ABSTRACT

Data associated with a workload is stored in a first composite array of data storage devices, and is automatically stored in a second composite array in response to predicting failure of one of the data storage devices in the first composite array. The data may be stored in the second composite array by either converting the first composite array or migrating the data to the second composite array. One of the data storage devices may predict its own failure and issue a predictive failure alert.

12 Claims, 3 Drawing Sheets

(51) Int. Cl.
  *G06F 3/06* (2006.01)
  *G06F 11/10* (2006.01)
  *G06F 11/14* (2006.01)

(52) U.S. Cl.
  CPC .......... *G06F 11/2058* (2013.01); *G06F 3/0647* (2013.01); *G06F 2201/84* (2013.01)

(56) References Cited

U.S. PATENT DOCUMENTS

| | | | |
|---|---|---|---|
| 7,127,716 | B2 | 10/2006 | Jin et al. |
| 7,162,711 | B2 | 1/2007 | Czajkowski et al. |
| 7,165,108 | B2 | 1/2007 | Matena et al. |
| 7,210,005 | B2 | 4/2007 | Guha et al. |
| 7,213,065 | B2 | 5/2007 | Watt |
| 7,257,811 | B2 | 8/2007 | Hunt et al. |
| 7,334,156 | B2 | 2/2008 | Land et al. |
| 7,395,388 | B2 | 7/2008 | Sugiura et al. |
| 7,437,730 | B2 | 10/2008 | Goyal |
| 7,484,208 | B1 | 1/2009 | Nelson |
| 7,680,919 | B2 | 3/2010 | Nelson |
| 7,716,377 | B2 | 5/2010 | Harris et al. |
| 7,734,843 | B2 | 6/2010 | Bender et al. |
| 7,774,650 | B2 | 8/2010 | Elliott et al. |
| 2002/0184442 | A1* | 12/2002 | Veitch et al. .................. 711/114 |
| 2003/0217166 | A1 | 11/2003 | Canto et al. |
| 2004/0039891 | A1 | 2/2004 | Leung et al. |
| 2004/0133743 | A1 | 7/2004 | Ito et al. |
| 2007/0130566 | A1 | 6/2007 | van Rietschote et al. |
| 2007/0143541 | A1* | 6/2007 | Nichols et al. ................ 711/114 |
| 2007/0150651 | A1 | 6/2007 | Nemiroff et al. |
| 2007/0288921 | A1 | 12/2007 | King et al. |
| 2008/0091761 | A1 | 4/2008 | Tsao |
| 2008/0196043 | A1 | 8/2008 | Feinleib et al. |
| 2008/0291570 | A1 | 11/2008 | Dorbeck et al. |
| 2008/0307183 | A1 | 12/2008 | DeVal et al. |
| 2009/0037656 | A1 | 2/2009 | Suetsugu et al. |
| 2009/0106409 | A1 | 4/2009 | Murata |
| 2009/0150529 | A1 | 6/2009 | Tripathi |
| 2009/0204718 | A1 | 8/2009 | Lawton et al. |
| 2009/0228589 | A1 | 9/2009 | Korupolu |
| 2009/0228629 | A1 | 9/2009 | Gebhart et al. |
| 2009/0248973 | A1 | 10/2009 | Deshpande et al. |
| 2009/0276569 | A1 | 11/2009 | Yamamoto et al. |
| 2009/0296726 | A1 | 12/2009 | Snively et al. |
| 2009/0328058 | A1 | 12/2009 | Papaefstathiou et al. |
| 2010/0138829 | A1 | 6/2010 | Hanquez et al. |

OTHER PUBLICATIONS

Urgaonkar-et al.; "Agile Dynamic Provisioning of Multi-Tier Internet Applications"; ACM Digital Library; pp. 1-39; 2008.
Shivam-et al.; "Automated an On-Demand Provisioning of Virtual Machines for Database Applications"; ACM Digital Library; pp. 1079-1081; 2007.
IBM—"Automatic Virtual Machine Provisioning"; IPCOM000128928D; 4 pages, Sep. 21, 2005.
Sundararaj-et al.; "Automatic, run-time and dynamic adaptation of distributed applications executing in virtual environments"; Dialog—Dissertation Absts., V67-10B; 2006.
Gulati et al., "RePAIR: Reservation-Based Proportionate Allocation for IO Resources", acknowledged in a brief announcement in PODC 2007, pp. 1-19.
Cisco, "Cisco Nexus 1000V Network Analysis Module Virtual Service Blade", Data Sheet, 2010, pp. 1-7.
Altor Networks, "5 Best Practices to Protect Your Virtual Environment", Altor Networkds White Paper: 5 Best Practices to Protect Your Virtual Environment, 2009-2010, pp. 1-5.
Anton Burtsev et al., "Fido: Fast Inter-Virtual-Machine Communication for Enterprise Appliances", 2009-2010, 1-37 slides (pages).
Chang-et al.; "Virtual machine support for zero-loss Internet service recovery"; INSPEC/Software: Practice & Experience, vol. 37, No. 13, pp. 1349-1376; Nov. 2007.
Jian Wang, "Survey of State-of-the-art in Inter-VM Communication Mechanisms", Sep. 27, 2009, pp. 1-25.
QLogic, "QLogic 10GbE Intelligent Networking Boosts Virtual Mahcine Performance", White paper, 2009 QLogic Corporation, pp. 1-4.
Chen, et al. White Paper—Optimizing I/O Virtualization: Preparing the Datacenter for Next-Generation Applications, IDC Analyze the Futrue, paper No. 220101, Sep. 2009, pp. 1-10.
Brocade, Architecture Brief: The Brocade Data Center Fabrick Reference Architecture for VMware vSphere 4, 2009 Brocade Communications Systems, pp. 1-18.
System Fabric Works, "Products—SystemFabricMem", http://www.systemfabricworks.com/fabricmem.html, Sep. 3, 2010, 2 pages.
Mysore-et al.; "Portland: a scalable fault-tolerant layer 2 data netowork fabric", ACM/INSPEC; vol. 39, No. 4, pp. 39-50; Oct. 2009.
QLogic; "8Gb Fibre Channel Optimized for Virtualized SAN Environments"; GOOGLE; 2009-2010, 8 pages.
Schmidt-et al.; "Extending the VIrtualization Infrastructure"; GOOGLE/Dell Power Solutions; Aug. 2006, 5 pages.
Valdez-et al.; "Retrofitting the IBM Power Hypervisor to Support Mandatory Access Control"; INSPEC/IEEE; 2008, 10 pages.
Trend Micro Ebook; "Securing Virtualized Datacenters"; GOOGLE; 2009, pp. 1-19.
Citrix Systems Inc.; "Virtualization, automation and advanced management for the datacenter"; GOOGLE; 2009, 4 pages.
Brocade; "Technical Brief: Introducing the Brocade Data Center Fabric"; GOOGLE; 2009-2010, 12 pages.
VMware & IBM; Getting the MAX from your Virtualized Environment: Comprehensive Solutions from VMware and IBM; GOOGLE: 2009-2010, 5 pages.
Eric Anderson et al., "Selecting Raid Levels for Disk Arrays", , Conference on File and Storage Technologies (FAST'02), pp. 189-201, Jan. 28-30, 2002, Monterey, CA, Publisher—USENIX Association Berkeley.
Netgear, "X-RAID—RAID for the rest of us", http://www.readynas.com/?cat=54, Sep. 30, 2010, pp. 1-9.
Jae Un, "U.S. Appl. No. 12/956,966 USPTO Office Action" Mail date Mar. 12, 2013, 11 pages.
Jae Un, "U.S. Appl. No. 12/956,966 USPTO Final Office Action" Mail date Jun. 26, 2013, 11 pages.
Jae Un, "U.S. Appl. No. 12/956,966 USPTO Office Action" Mail date Nov. 19, 2013, 14 pages.
Jae Un, "U.S. Appl. No. 12/956,966 USPTO Final Office Action" Mail date Apr. 3, 2014, 10 pages.
Jae Un, "U.S. Appl. No. 12/956,966 USPTO Office Action" Mail date Sep. 25, 2014, 10 pages.
Jae Un, "U.S. Appl. No. 13/541,429 USPTO Office Action" Mail date Apr. 9, 2013, 18 pages.
Jae Un, "U.S. Appl. No. 13/541,429 USPTO Final Office Action" Mail date Aug. 16, 2013, 15 pages.
Jae Un, "U.S. Appl. No. 13/541,429 USPTO Office Action" Mail date Nov. 19, 2013, 10 pages.
Jae Un, "U.S. Appl. No. 13/541,429 USPTO Final Office Action" Mail date Apr. 3, 2014, 13 pages.
Jae Un, "U.S. Appl. No. 13/541,429 USPTO Office Action" Mail date Sep. 24, 2014, 10 pages.

\* cited by examiner

DYNAMIC USE OF RAID LEVELS RESPONSIVE TO PREDICTED FAILURE OF A DATA STORAGE DEVICE

CROSS-REFERENCE TO RELATED APPLICATIONS

This application in a divisional of U.S. patent application Ser. No. 13/541,429, filed on Jul. 3, 2012, which is a continuation of U.S. patent application Ser. No. 12/956,966, filed on Nov. 30, 2010.

BACKGROUND

1. Field of the Invention

The present invention relates to the management of data storage, specifically including the use of a redundant array of independent disks.

2. Background of the Related Art

In modern computer systems, the need for data reliability and input/output performance has led to the development of a series of data storage schemes that divide and replicate data among multiple data storage devices. Such a storage scheme is commonly referred to as a Redundant Array of Independent Disks (RAID). A RAID system combines physical data storage devices, such as hard disk drives, into a single logical unit by using either special hardware or software. A hardware solution will typically be designed to present itself to the attached system as a single device or drive, such that the operating system is unaware of the technical workings of the underlying array. Alternatively, a software solution may be implemented in an operating system, and would similarly present the RAID drive to applications as a single device or drive. The minimum number of drives and the level of data reliability depend on the type of RAID scheme that is implemented.

Originally there were five RAID levels, but variations, nested levels and nonstandard levels have evolved. Different RAID levels use one or more techniques referred to as mirroring, striping and error correction. Mirroring involves the copying of data to more than one disk, striping involves the spreading of data across more than one disk, and error correction involves storing redundant data to allow problems to be detected and possibly fixed.

A RAID 0 array spreads data evenly across two or more disks with no parity. Accordingly, it can be said that RAID 0 provides striping without any redundancy. RAID 0 is appropriate for high performance where there is little or no concern over data integrity.

A RAID 1 array provides a complete and exact copy of data on two or more disks. Accordingly, RAID 1 includes complete redundancy or mirroring. The performance of RAID 1 is good, and may optionally include duplexing that enables independent reading of different sectors of the disks to increase speed further. The data integrity of RAID 1 is also good, due to the complete copy maintained in the companion disk.

In general, RAID 3 provides byte-level striping with a dedicated parity disk, RAID 4 provides block-level striping with a dedicated parity disk, and RAID 5 provides block-level striping with parity data distributed across all member disks. RAID 5 has achieved popularity due to its low cost of redundancy. Generally, RAID 5 is implemented with hardware support for parity calculations. A minimum of three disks is generally required for a complete RAID 5 configuration. RAID 5 offers a balance between price and performance for most commercial server workloads, and provides single-drive fault tolerance by implementing a technique called single equation single unknown. The checksum information is evenly distributed over all drives, and checksum update operations are evenly balanced within the array.

During read operations, parity blocks are typically not read since this would be unnecessary overhead and would diminish performance. The parity blocks are read, however, when a read of a data sector results in a CRC error (each sector is protected by a CRC as well). In this case, the sector in the same relative position within each of the remaining data blocks in the stripe and within the parity block in the stripe are used to reconstruct the errant sector. The CRC error is thus hidden from the main computer. Likewise, should a disk fail in the array, the parity blocks from the surviving disks are combined mathematically with the data blocks from the surviving disks to reconstruct the data on the failed drive "on the fly". However, in RAID 5, where there is a single parity block per stripe, the failure of a second drive results in total data loss.

There are many other RAID levels in existence and being developed over time to address the needs for performance, data integrity, and control of costs. The foregoing discussion of RAID levels is intended to provide general examples of features included in different RAID levels, and is not intended be a comprehensive list or description of RAID levels.

BRIEF SUMMARY

One embodiment of the present invention provides a method comprising storing data associated with a workload in a first composite array of data storage devices, and automatically storing the data associated with the workload in a second composite array of data storage devices in response to predicting failure of one of the data storage devices in the first composite array.

Another embodiment of the present invention provides a computer program product comprising a computer readable storage medium having program instructions embodied therewith, the program instructions executable by a processor to cause the processor to perform a method. The method comprises storing data associated with a workload in a first composite array of data storage devices, and automatically storing the data associated with the workload in a second composite array of data storage devices in response to predicting failure of one of the data storage devices in the first composite array.

DETAILED DESCRIPTION

Figure 1:
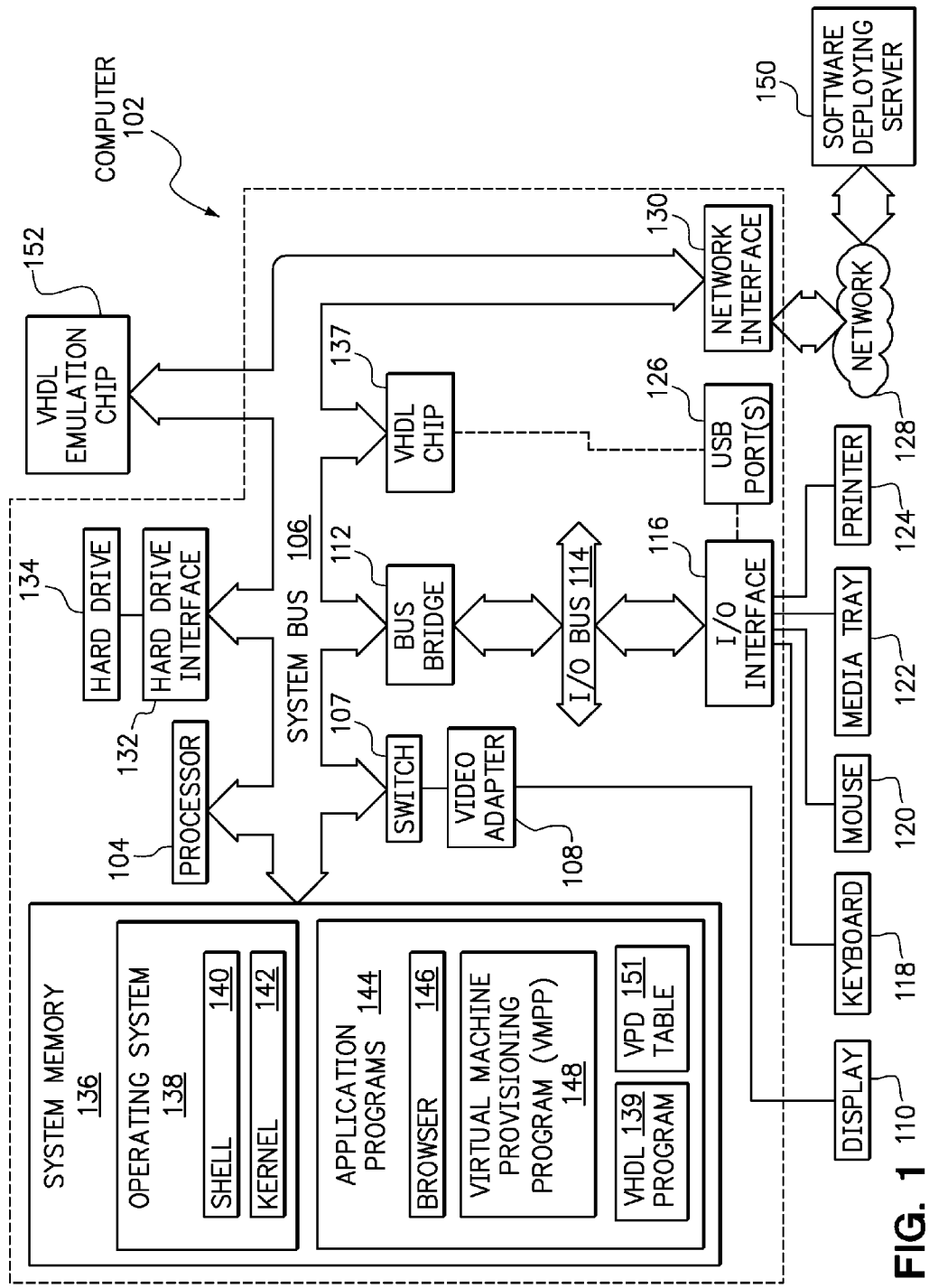
FIG. 1 is a diagram of a computer that may be utilized in accordance with the present invention.

One embodiment of the present invention provides a computer program product including computer usable program code embodied on a computer usable storage medium. According to this embodiment, the computer program product comprises computer usable program code for storing data associated with a workload in a first composite array of data storage devices that meets first data storage requirements of the workload, and computer usable program code for automatically storing the data associated with the workload in a second composite array of data storage devices in response to detecting second data storage requirements of the workload, wherein the second composite array of data storage devices meets the second data storage requirements.

The first composite array may differ from the second composite array in one or more parameters selected from level of striping, mirroring, parity, and nesting. For example, the first composite array may be a redundant array of inexpensive disks (RAID) configured at a first level and the second composite array may be a redundant array of inexpensive disks (RAID) configured at a second level.

In a preferred embodiment, a RAID system will dynamically shift RAID levels in accordance with changing workload performance and resiliency requirements. For example, a higher performing RAID level can be selected if a large, strenuous workload is scheduled to be performed. Additionally, a more resilient RAID level can be selected for continued operation of a workload in response to a predictive failure alert or an actual failure being detected by a systems management controller or other device. For example, RAID level 0 favors performance as compared to a RAID level 5 that favors resiliency.

In a further embodiment, the computer usable program code for storing the data associated with the workload in a second composite array of data storage devices in response to detecting second data storage requirement of the workload, includes computer usable program code for converting the first composite array into the second composite array. Such a conversion will typically use one or more of the disks from first composite array in the second composite array. While the first and second composite arrays may have exactly the same disks, it is also possible to convert to a composite array having fewer disks or even more disks if they are available in the system. However, since conversion of a RAID array from one level to another level can be very computationally expensive, the extent of the conversion can be minimized by using a larger number of smaller disks. For example, rather than having 10 drives of 1 TB capacity each, a system might use 100 drives of 100 MB each, or even 1000 drives of 10 MB each. When a workload is identified that requires high performance, a new RAID 0 array can be created of appropriate size to meet the need, and the data can be transferred to that array. The smaller the total array size needed, the smaller the computational overhead to convert the array. A first composite array may be converted in place to a second composite array having a different RAID level using commercially available software.

In another embodiment, the first composite array is converted to the second composite array in response to an increase in the workload performance requirement, wherein the second composite array has a higher performance than the first composite array. In a first example, the first composite array may be converted to the second composite array in response to the workload running at greater than a workload performance setpoint, wherein the second composite array has greater performance than the first composite array. More specifically, a workload manager may determine that the workload is causing the first composite array to run at full capacity for more than a setpoint period of time and, in response, cause the first composite array to be converted to a second composite array that has greater performance than the first composite array. In a second example, the first composite array may be converted to the second composite array in response to the first composite array running at less than a workload performance setpoint, wherein the second composite array has a higher resilience than the first composite array. More specifically, the workload manager may determine that the first composite array is running at near idle capacity for more than a setpoint period of time and, in response, cause the first composite array to be migrated to a second composite array having a higher resilience than the first composite array.

In a still further embodiment, the computer usable program code for storing the data associated with the workload in a second composite array of data storage devices in response to detecting second data storage requirements of the workload, includes computer usable program code for migrating the data from the first composite array to the second composite array. In a first example, the data may be migrated to the second composite array in response to the workload running at greater than a workload performance setpoint, wherein the second composite array has greater performance than the first composite array. More specifically, a workload manager may determine that the workload is causing the first composite array to run at full capacity for more than a setpoint period of time and, in response, cause the data to be migrated to a second composite array that has greater performance than the first composite array. In a second example, the data may be migrated to the second composite array in response to the first composite array running at less than a workload performance setpoint, wherein the second composite array has a higher resilience than the first composite array. More specifically, the workload manager may determine that the first composite array is running at near idle capacity for more than a setpoint period of time and, in response, cause the data to be migrated to a second composite array having a higher resilience than the first composite array.

In a further embodiment, a systems management agent instructs a RAID controller to convert the first composite array into the second composite array in response to the system management agent detecting a change in a performance requirement or resiliency requirement of the workload. In various embodiments of the invention, a communications path must be established between the RAID controller performing the RAID array conversions, and one or more systems management agents that are detecting failures and managing the workload. The systems management agent may run on the operating system (OS), a systems management controller, or a combination thereof. In one example, the systems management agent is running on a systems management controller, and the RAID controller is linked to it via I2C, PCIe, or other system bus. In a second example, the RAID controller and systems management controller communicate to each other by passing data up through a software agent running on the operating system. The software agent would need to be capable of communicating with both the RAID controller and the systems management device, possibly by having knowledge of each controller's device driver API.

In addition to handling workloads that are already running on a composite array, embodiments of the invention may assign new workloads to a composite array that most closely meets the performance and resilience requirements of the workload. Accordingly, a high value workload will be assigned to a resilient array, and a memory intensive workload will be assigned to a high performance array.

In a further embodiment, a workload manager is responsible for shifting resources in the datacenter to accommodate the tasks being supported at any given time. For example, an important project may have a preparation phase, an initiation phase, and an ongoing work phase. The preparation phase may involve performing large amounts of calculations, the results of which produces large sets of data which would be extremely detrimental to the organization if lost. The initiation phase may be a highly complex real-time phase where all data must be available as quickly as possible. The ongoing work phase may involve the production of data that is vital to the project and must be protected at all costs. In accordance with embodiments of the present invention, a RAID array can be dynamically converted to support each of these three phases. Initially, a RAID 5 array could be designated for use during the preparation phase. Once the data generation of this phase has completed, the array can be converted (or migrated) to a high performance RAID 0 array in support of the initiation phase. After the initiation phase has completed, the RAID 0 array could be converted back to a RAID 5 array to support the ongoing work phase.

Embodiments of the invention provide a workload manager that controls the balance of storage performance and resiliency required by the workload by dynamically changing the RAID levels upon which the supporting data is stored. In accordance with the workload requirements, status of storage devices, and the available storage options, the workload manager may select among the available storage options. Those storage options include, without limitation, converting the data in place (i.e., from one array configuration to another array configuration having the desired performance/resilience), or migrating the data to another array having the desired performance/resilience. The ability to dynamically convert and/or migrate data to different array configurations that meet the performance and resilience requirements of the workload makes it unnecessary to set up a hybrid array (such as a RAID 50 array with redundant striped arrays) that provides both the performance requirement of the workload and the resilience requirement of the workload. A hybrid array is generally a fixed configuration requiring a large number of disks, whereas some embodiments of the invention may involve fewer disks that dynamically change RAID levels to meet the present needs of the workload(s).

In a further embodiment, a workload can notify a management controller that a critical storage I/O window is scheduled for an upcoming time, such that the management controller can ensure that the workload is provided adequate resiliency during that period. Thus there is a "schedule" or "calendar" for all workloads that can indicate when periods of resiliency, or performance, are required. For example, daily/weekly/monthly backups at 3:00 am might require temporary high performance, but the default policy for the backup workload might be high resiliency.

The term "workload", as used herein, refers to a task executed by one or more virtual machines or it may be one or more applications. A single workload is one or more related software tasks that are performed together. In embodiments involving a plurality of workloads, those workloads may include virtual machines, applications, or both.

The term "performance", as used herein, refers to a metric of the speed or bandwidth of data being handled. For example, a composite array has a performance that is determined by how fast data can be stored.

The term "resilience", as used herein, refers to the ability of a composite array to recover from the failure of one of the storage devices in the array. For example, a fully redundant array of disks (i.e., a primary disk and secondary disk containing the same data) is highly resilient since the failure of one disk leaves the other disk for continued use.

Although much of the foregoing discussion of various embodiment focuses on the handling a single workload, it should be recognized that the invention may be used in the handling of a plurality of workloads having data stored on one or more composite array of storage devices. Accordingly, one or more composite arrays may be converted, and/or the data associated with one of more workloads may be migrated in order to position data on a composite array that meets the performance and resilience requirements of the individual workloads. As performance and resilience requirements of the workloads changes, or as the reliability of one or more storage devices changes, embodiments of the invention may dynamically convert an array or dynamically migrate data among arrays in order to more closely meet the current performance and resilience requirements of the workloads.

Another embodiment of the invention provides a computer program product including computer usable program code embodied on a computer usable storage medium. The computer program product of this embodiment comprises computer usable program code for storing data associated with a workload in a first composite array of data storage devices, and computer usable program code for automatically storing the data associated with the workload in a second composite array of data storage devices in response to predicting failure of one of the data storage devices in the first composite array. Like the foregoing embodiments, the first composite array may differ from the second composite array in one or more parameters selected from level of striping, mirroring, parity, and nesting. For example, the first composite array may be a redundant array of inexpensive disks (RAID) configured at a first level and the second composite array may be a redundant array of inexpensive disks (RAID) configured at a second level.

However, embodiments that respond to predicting failure of one of the data storage device in the first composite array, will preferably seek to assure that the data resides on a composite array that can recover from the potential failure of a data storage device. If the data is not already stored on a resilient composite array, then the method may respond to receiving a predictive failure alert by increasing the resilience of the composite array on which the data is being stored. In a first option, the first composite array may be converted into a second composite array, wherein the second composite array has a higher resilience than the first composite array. In a second option, data associated with the workload may be migrated from the first composite array (such as a RAID 0) to a second composite array (such as a RAID 5) having a higher resilience than the first composite array.

In an additional embodiment, a data storage device in the first composite array may be the source of a predictive failure alert, yet the same data storage device may be included in the second composite array. Automatic conversion of the first composite array into the more resilient second composite array will protect the data from the potential failure of the ailing data storage device. Good administration practices may dictate that the ailing data storage device should be replaced at the administrator earliest convenience, but the automatic conversion of the array in response to a predictive failure alert serves to provide additional resilience. The foregoing conversion of the composite array or migration of the data may be initiated by a systems management agent providing instructions to a RAID controller. Alternatively, automatic migration of the data to a second composite array, which may be initiated by a workload manager, makes the subsequent condition of the ailing disk irrelevant to the data.

A predictive failure alert may originate from a hard disk, a management controller, or a storage controller. Each hard disk may have its own microcontroller onboard, typically running Self-Monitoring, Analysis, and Reporting Technology (SMART), which tracks its own read/write errors and will flag when it predicts a failure. A management controller may toss a PFA on a hard drive thermal trip, or voltage irregularity. A storage controller could toss a PFA if reads or writes begin taking longer than expected, or if the storage controller sees that the hard disk performance is degrading.

With reference now to the figures, FIG. 1 is a block diagram of an exemplary computer 102, which may be utilized by the present invention. Note that some or all of the exemplary architecture, including both depicted hardware and software, shown for and within computer 102 may be utilized by software deploying server 150, as well as provisioning manager/management node 222, and server blades 204a-n shown below in FIG. 2 and FIG. 3. Note that while blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," "server," and "compute node" are used interchangeably in the present descriptions.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine provisioning program—VMPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below) external USB port(s) 126. While the format of the ports connected to I/O interface 116 may be any known to those skilled in the art of computer architecture, in a preferred embodiment some or all of these ports are universal serial bus (USB) ports.

As depicted, the computer 102 is able to communicate with a software deploying server 150 via network 128 using a network interface 130. The network 128 may be an external network such as the Internet, or an internal network such as an Ethernet or a virtual private network (VPN).

A hard drive interface 132 is also coupled to the system bus 106 and interfaces with a hard drive 134. Optionally, the hard drive interface 132 may be a RAID controller and the hard drive 134 may be substituted with two or more disks forming a composite array. In a preferred embodiment, the hard drive 134 communicates with a system memory 136, which is also coupled to the system bus 106. System memory is defined as a lowest level of volatile memory in the computer 102. This volatile memory includes additional higher levels of volatile memory (not shown), including, but not limited to, cache memory, registers and buffers. Data that populates the system memory 136 includes the operating system (OS) 138 and application programs 144 of the computer 102.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 is a text-based, line-oriented user interface, the present invention will equally well support other user interface modes, such as graphical, voice, gestural, etc.

As depicted, the operating system 138 also includes kernel 142, which includes lower levels of functionality for the operating system 138, including providing essential services required by other parts of the operating system 138 and application programs 144, including memory management, process and task management, disk management, and mouse and keyboard management.

The application programs 144 include an optional renderer, shown in exemplary manner as a browser 146. The browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in the system memory of the computer 102 (as well as the system memory of the software deploying server 150) also include a virtual machine provisioning program (VMPP) 148. The VMPP 148 includes code for implementing the processes described below, including those described in FIGS. 2-3. The VMPP 148 is able to communicate with a vital product data (VPD) table 151, which provides required VPD data described below. In one embodiment, the computer 102 is able to download the VMPP 148 from software deploying server 150, including in an on-demand basis. Note further that, in one embodiment of the present invention, the software deploying server 150 performs all of the functions associated with the present invention (including execution of VMPP 148), thus freeing the computer 102 from having to use its own internal computing resources to execute the VMPP 148.

Optionally also stored in the system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes VHDL program 139 to configure VHDL chip 137, which may be an FPGA, ASIC, etc.

In another embodiment of the present invention, execution of instructions from the VMPP 148 results in a utilization of the VHDL program 139 to program a VHDL emulation chip 152. The VHDL emulation chip 152 may incorporate a similar architecture as described above for VHDL chip 137. Once VMPP 148 and VHDL program 139 program the VHDL emulation chip 152, VHDL emulation chip 152 performs, as hardware, some or all functions described by one or more executions of some or all of the instructions found in VMPP 148. That is, the VHDL emulation chip 152 is a hardware emulation of some or all of the software instructions found in VMPP 148. In one embodiment, VHDL emulation chip 152 is a programmable read only memory (PROM) that, once burned in accordance with instructions from VMPP 148 and VHDL program 139, is permanently transformed into a new circuitry that performs the functions needed to perform the process described below in FIGS. 2-3.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
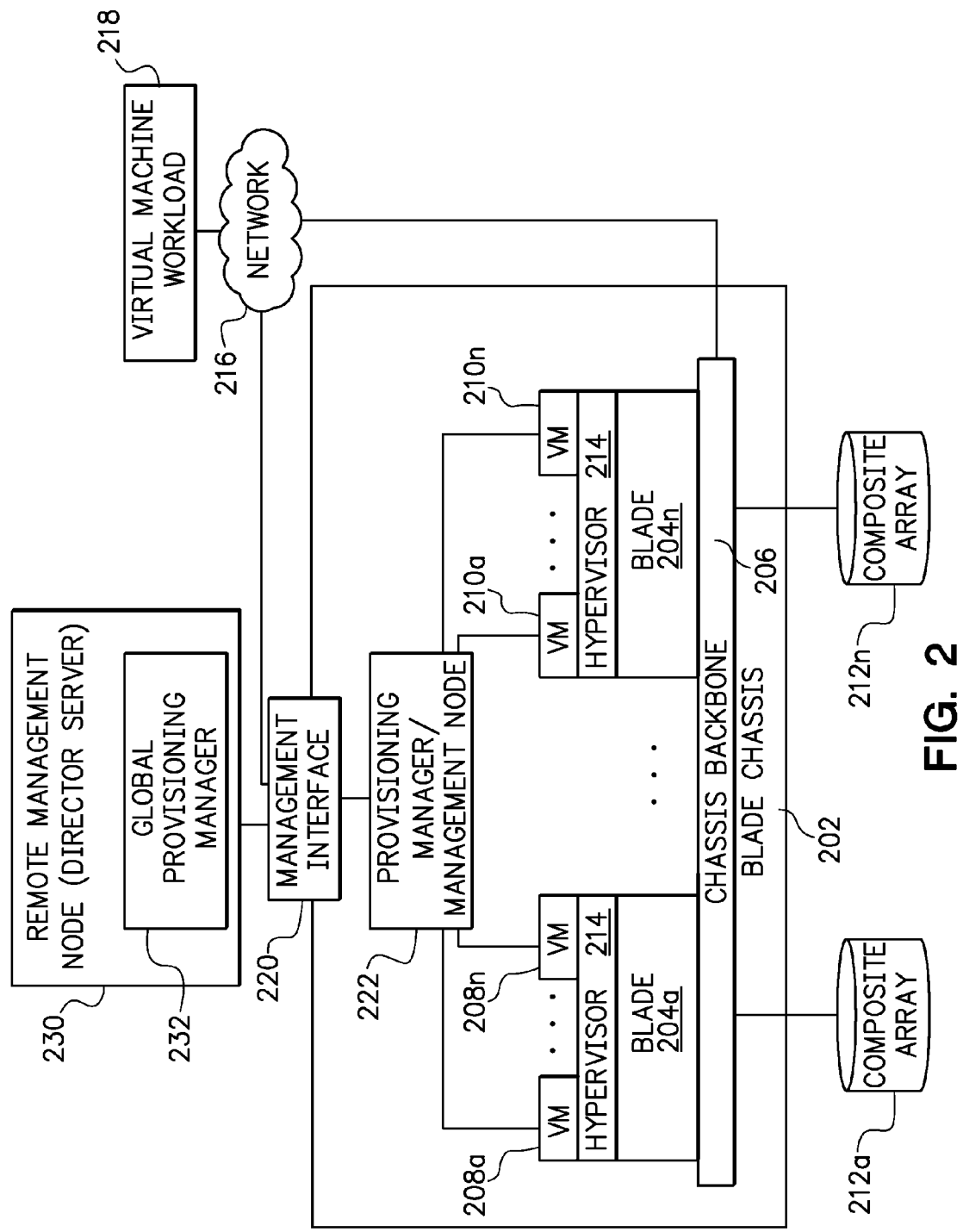
FIG. 2 is a diagram of a multi-server chassis that may be utilized in accordance with the present invention.

FIG. 2 is a diagram of an exemplary multi-server chassis in the form of a blade chassis 202 operating as a "cloud" environment for a pool of resources. Blade chassis 202 comprises a plurality of blades 204a-n (where "n" is an integer) coupled to a chassis backbone 206. Each blade is able to support one or more virtual machines (VMs). As known to those skilled in the art of computers, a VM is a software implementation (emulation) of a physical computer. A single physical computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As shown in FIG. 2, the blade 204a supports a plurality of VMs 208a-n (where "n" is an integer), and the blade 204n supports a further plurality of VMs 210a-n (wherein "n" is an integer). The blades 204a-n are each coupled to one of the composite arrays 212a-n, respectively, and provides a hypervisor 214, guest operating systems, and applications for users (not shown). Provisioning software is loaded into the provisioning manager/management node 222 (also referred to herein as a chassis management controller) to allocate virtual machines among the blades in accordance with various embodiments of the invention described herein. The computer hardware characteristics are communicated from the VPD 151 to the VMPP 148 (per FIG. 1). The VMPP may communicate the computer physical characteristics to the blade chassis provisioning manager 222 to the management interface 220 through the network 216, and then to the Virtual Machine Workload entity 218.

Note that the chassis backbone 206 is also coupled to a network 216, which may be a public network (e.g., the Internet), a private network (e.g., a virtual private network or an actual internal hardware network), etc. The network 216 permits a virtual machine workload 218 to be communicated to a management interface 220 of the blade chassis 202. This virtual machine workload 218 is a software task whose execution is requested on any of the VMs within the blade chassis 202. The management interface 220 then transmits this workload request to a provisioning manager/management node 222, which is hardware and/or software logic capable of configuring VMs within the blade chassis 202 to execute the requested software task. In essence the virtual machine workload 218 manages the overall provisioning of VMs by communicating with the blade chassis management interface 220 and provisioning management node 222. Then this request is further communicated to the VMPP 148 in the generic computer system (See FIG. 1). Note that the blade chassis 202 is an exemplary computer environment in which the presently disclosed system can operate. The scope of the presently disclosed system should not be limited to merely blade chassis, however. That is, the presently disclosed method and process can also be used in any computer environment that utilizes some type of workload management, as described herein. Thus, the terms "blade chassis," "computer chassis," and "computer environment" are used interchangeably to describe a computer system that manages multiple computers/blades/servers.

FIG. 2 also shows an optional remote management node 230, such as an IBM Director Server, in accordance with a further embodiment of the invention. The remote management node 230 is in communication with the chassis management node 222 on the blade chassis 202 via the management interface 220, but may communicate with any number of blade chassis and servers. A global provisioning manager 232 is therefore able to communicate with the (local) provisioning manager 222 and work together to perform the methods of the present invention. The optional global provisioning manager is primarily beneficial in large installations having multiple chassis or racks of servers, where the global provisioning manager can coordinate inter-chassis migration or allocation of VMs.

The global provisioning manager preferably keeps track of the VMs of multiple chassis or multiple rack configurations. If the local provisioning manager is able, that entity may be responsible for implementing an early power off warning (EPOW) response policy within the chassis or rack and send that information to the global provisioning manager. The global provisioning manager would be involved in migrating VMs among multiple chassis or racks, if necessary, and perhaps also instructing the local provisioning management to migrate certain VMs. For example, the global provisioning manager 232 may build and maintain a table containing the same VM data as the local provisioning manager 222, except that the global provisioning manager would need that data for VMs in each of the chassis or racks in the multiple chassis or multiple rack system. The tables maintained by the global provisioning manager 232 and each of the local provisioning managers 222 would be kept in sync through ongoing communication with each other. Beneficially, the multiple tables provide redundancy that allows continued operation in case one of the provisioning managers stops working.

Figure 3:
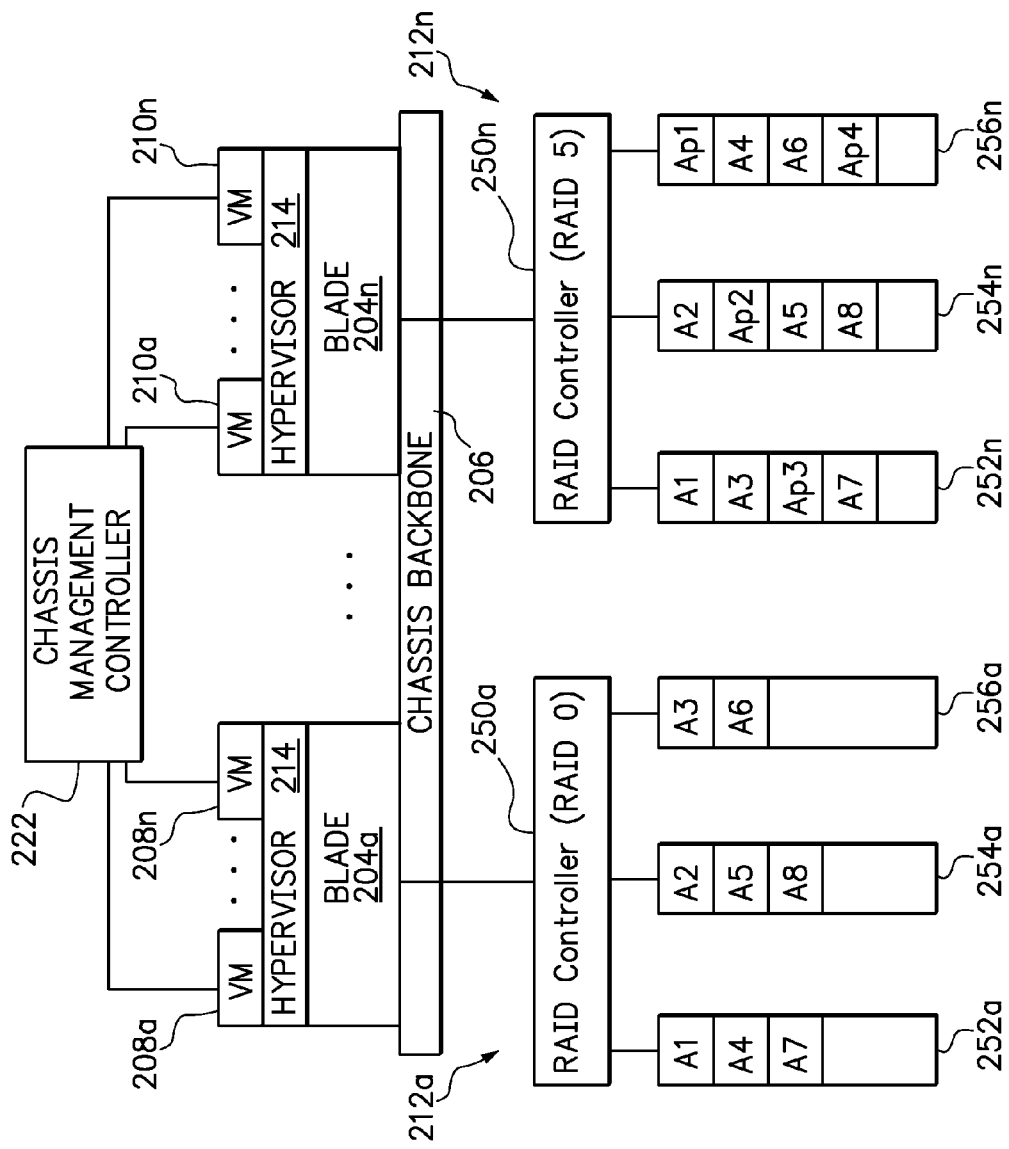
FIG. 3 is a diagram of an exemplary multi-server chassis, consistent with FIG. 2, showing two RAID arrays configured at two different levels.

FIG. 3 is a diagram of an exemplary multi-server chassis, consistent with FIG. 2. A first blade server 204a and a second blade server 204n are show to include or have access to a composite array 212a, 212n, respectively. The first composite array 212a includes a first RAID controller 250a and three disks 252a, 254a, 256a. As shown, the first RAID controller 250a has configured the three disks into a RAID 0 array. The RAID 0 array provides block-level striping without parity or mirroring, and requires a minimum of 2 disks, but provides no resilience (i.e., no fault/failure tolerance). Accordingly, the blocks A1, A2 and A3 are striped across the three disks, before subsequent blocks A4, A5 and A6 are striped across the same three disks.

The second RAID controller 250n has configured its three disks into a RAID 5 array. The RAID 5 array provides block-level striping with distributed parity, and requires a minimum of 3 disks. The RAID 5 array 250n is more resilient (i.e., more fault/failure tolerant) than the RAID 0 array 250a, because a RAID 5 array can be rebuilt following the failure of any one of the disks in the RAID 5 array. Accordingly, the RAID controller 212n stores data in a first stripe via blocks A1 and A2 followed by a first parity block $Ap_1$, then stores additional data in a second stripe via blocks A3, a second parity block Ap2, and then block A4. By placing the first parity block Ap1 on disk three, and the second parity block on disk 2, the RAID 5 array is said to have "distributed parity."

Various embodiments of the invention described above may be discussed with reference to FIG. 3. For example, in response to a workload (VM 208a) having a high performance requirement, the data associated with that workload is stored on the RAID 0 composite array 212*a*. However, composite array 212*a* has low resilience. In response to the workload having a reduced performance requirement or a higher resilience requirement, the chassis management controller 222 may either migrate the data from the first composite array 212*a* to the second composite array 212*n*, or convert the first composite array 212*a* to a second composite array having greater resilience (such as a RAID 5 array, like that shown as array 212*n*). Since a RAID 0 array and a RAID 5 array can both be configured with three disks, the RAID controller 250*a* can perform this conversion using the same three disks 252*a*, 254*a*, 256*a*.

Conversely, if a workload (VM 210*a*) on the blade server 204*n* originally had a high resilience requirement, it might be placed on the RAID 5 composite array 212*n*. However, composite array 212*n* has lower performance than a RAID 0 array. In response to the workload causing the RAID 5 controller 250*n* to work at full capacity for a predetermined period, such as 20 seconds, the chassis management controller 222 may either migrate the data from the second composite array 212*n* to the first composite array 212*a*, or convert the second composite array 212*n* to a composite array having greater performance (such as a RAID 0 array, like that shown as array 212*a*). Since a RAID 0 array and a RAID 5 array can both be configured with three disks, the RAID controller 250*n* can perform this conversion using the same three disks 252*n*, 254*n*, 256*n*.

Similarly, in response to any of the three disks 252*a*, 254*a*, 256*a* issuing a predictive failure alert, the chassis management controller 222 may take either of the convert or migrate actions just described in order to place the data on a composite array having greater resilience, such as a RAID 5. Should one of the disks fail, the array can then be rebuilt.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    storing data associated with a workload in a first composite array of data storage devices configured as a redundant array of inexpensive disks configured at a first level; and
    automatically storing the data associated with the workload in a second composite array of data storage devices in response to predicting failure of one of the data storage devices in the first composite array, wherein the second composite array is a redundant array of inexpensive disks configured at a second level that is different than the first level, wherein storing the data associated with the workload in a second composite array of data storage devices in response to predicting failure of one of the data storage devices, includes converting the first composite array into the second composite array, and wherein the second composite array has a higher resilience than the first composite array.

2. The method of claim 1, wherein the first composite array differs from the second composite array in one or more parameters selected from level of striping, mirroring, parity, and nesting.

3. The method of claim 1, wherein the data storage device predicted to fail is included in the second composite array.

4. The method of claim 1, further comprising:
    a systems management agent instructing a redundant array of inexpensive disks controller to convert the first composite array into the second composite array in response to the system management agent receiving a predictive failure alert for a data storage device in the first composite array.

5. The method of claim 4, wherein the systems management agent is running on an operating system, a systems management controller, or a combination thereof.

6. The method of claim 1, further comprising:
    one of the data storage devices predicting its own failure and issuing a predictive failure alert to the redundant array of inexpensive disks controller.

7. A computer program product comprising a computer readable storage medium having program instructions embodied therewith, the program instructions executable by a processor to cause the processor to perform a method, the method comprising:
    storing data associated with a workload in a first composite array of data storage devices; and
    automatically storing the data associated with the workload in a second composite array of data storage devices in response to predicting failure of one of the data storage devices in the first composite array, wherein the first composite array is a redundant array of inexpensive disks configured at a first level and the second composite array is a redundant array of inexpensive disks configured at a second level, wherein storing the data associated with the workload in a second composite array of data storage devices in response to predicting failure of one of the data storage devices, includes converting the first composite array into the second composite array, and wherein the second composite array has a higher resilience than the first composite array.

8. The computer program product of claim 7, wherein the first composite array differs from the second composite array in one or more parameters selected from level of striping, mirroring, parity, and nesting.

9. The computer program product of claim 7, wherein the data storage device predicted to fail is included in the second composite array.

10. The computer program product of claim 7, the method further comprising:
    a systems management agent instructing a redundant array of inexpensive disks controller to convert the first composite array into the second composite array in response to the system management agent receiving a predictive failure alert for a data storage device in the first composite array.

11. The computer program product of claim 10, wherein the systems management agent is running on an operating system, a systems management controller, or a combination thereof.

12. The computer program product of claim 7, the method further comprising:
    one of the data storage devices predicting its own failure and issuing a predictive failure alert to the redundant array of inexpensive disks controller.

* * * * *